(12) United States Patent
Prue et al.

(10) Patent No.: US 9,097,126 B2
(45) Date of Patent: Aug. 4, 2015

(54) SYSTEM AND METHOD FOR AIRFOIL COVER PLATE

(75) Inventors: Christopher Michael Prue, Simpsonville, SC (US); Jesse Blair Butler, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 458 days.

(21) Appl. No.: 13/612,769

(22) Filed: Sep. 12, 2012

(65) Prior Publication Data
US 2014/0072448 A1 Mar. 13, 2014

(51) Int. Cl.
*F01D 5/20* (2006.01)

(52) U.S. Cl.
CPC ............ *F01D 5/20* (2013.01); *F05D 2240/307* (2013.01); *F05D 2300/514* (2013.01); *F05D 2300/612* (2013.01); *Y02T 50/673* (2013.01); *Y02T 50/676* (2013.01); *Y10T 29/49337* (2015.01)

(58) Field of Classification Search
CPC ............... F01D 5/20; F05D 2240/307; F05D 2300/514; Y10T 29/49336; Y10T 29/49339; Y10T 29/49341; Y10T 29/49343; Y02T 50/676

USPC ................. 415/173.4; 416/92, 96 A
See application file for complete search history.

(56) References Cited

U.S. PATENT DOCUMENTS

| | | | |
|---|---|---|---|
| 3,982,851 A * | 9/1976 | Andersen et al. ................ 416/92 |
| 5,309,636 A * | 5/1994 | McGovern et al. ......... 29/890.01 |
| 5,752,802 A * | 5/1998 | Jones .......................... 415/170.1 |
| 6,135,715 A * | 10/2000 | Correia ....................... 416/97 R |
| 6,755,619 B1 | 6/2004 | Grylls et al. |
| 7,500,828 B2 | 3/2009 | Landis |
| 2011/0211965 A1* | 9/2011 | Deal et al. .................. 416/223 R |
| 2013/0302166 A1* | 11/2013 | Lee et al. ......................... 416/95 |
| 2013/0315749 A1* | 11/2013 | Zhang et al. ................ 416/97 R |

* cited by examiner

*Primary Examiner* — Edward Look
*Assistant Examiner* — Jason Davis
(74) *Attorney, Agent, or Firm* — Fletcher Yoder, P.C.

(57) ABSTRACT

A system includes at least one gas turbine blade that includes at least one recess disposed in a surface of the at least one gas turbine blade. The system also includes a porous insert that includes multiple pores that enable a cooling fluid to flow through the porous insert. The system further includes a cover plate, wherein the porous insert is disposed within the at least one recess, and the cover plate is disposed over the porous insert to enclose the porous insert within the at least one recess.

21 Claims, 5 Drawing Sheets

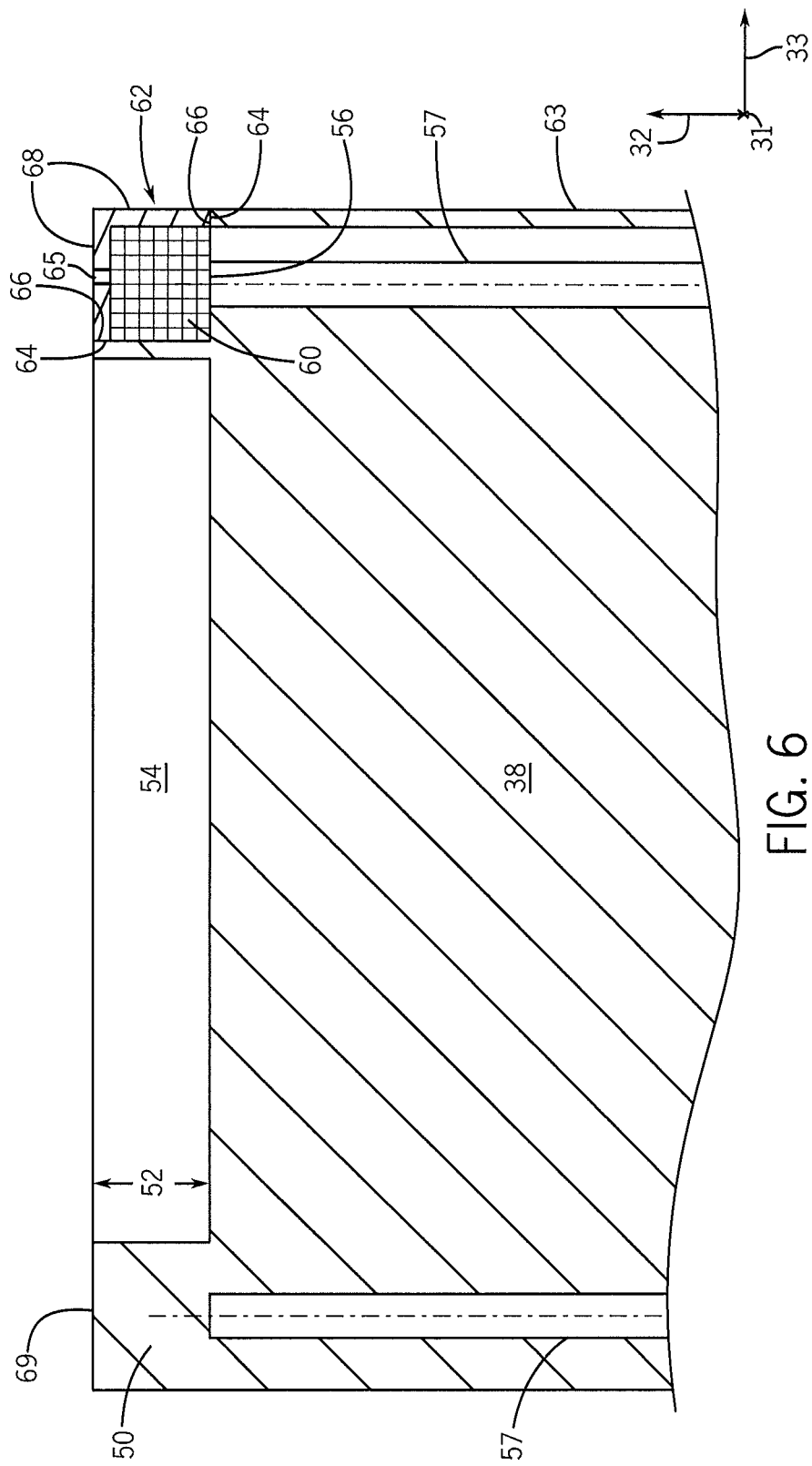

us 9,097,126 B2

SYSTEM AND METHOD FOR AIRFOIL COVER PLATE

BACKGROUND OF THE INVENTION

The subject matter disclosed herein relates to gas turbines, and, more specifically, to cover plates for gas turbine blades.

In general, gas turbine engines combust a mixture of compressed air and fuel to produce hot combustion gases. The hot combustion gases apply force to the blades in a turbine, which rotate a shaft coupled to the blades. The rotation of the shaft may generate power for a load and/or compressor. The gas turbine environment subjects the turbine blades to high temperatures, which may lead to thermal stresses, wear, and/or cracks in the turbine blades. As such, the turbine blades may be a life-limiting component of the gas turbine engine. Specifically, particular regions of the turbine blades may be life-limiting regions. These life-limiting regions may degrade prior to the majority of the blade, resulting in costly blade replacements and turbine down time.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine blade having a first recess disposed in a surface of the turbine blade. The system also has a first porous insert with a plurality of pores, which enable a cooling fluid to flow through the first porous insert, wherein the first porous insert is disposed within the first recess. A first cover plate is disposed over the first porous insert to enclose the first porous insert within the first recess.

In a second embodiment, a method includes disposing a porous insert within a recess of a turbine blade, wherein the porous insert includes multiple pores that enable a cooling fluid to flow through the porous insert. The method also includes applying a blocking material to an outer edge of a cover plate, disposing the cover plate over the porous insert, and brazing the cover plate to the turbine blade to enclose the porous insert within the recess.

In a third embodiment, a system includes a gas turbine engine. The gas turbine engine includes multiple gas turbine blades. At least two of the gas turbine blades each include a tip rail located at a radial tip and a recess disposed along its respective tip rail. The gas turbine engine also includes a porous insert disposed within each recess, wherein each porous insert includes multiple pores that enable a cooling fluid to flow through each porous insert. Additionally, the gas turbine engine further includes a cover plate disposed over each porous insert. Each cover plate is coupled to each respective gas turbine blade to enclose each respective porous insert within its respective recess, and each cover plate is coupled to each respective gas turbine blade without blocking flow of the cooling fluid flow through the porous insert.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a cross-sectional view of an embodiment of the tip of the gas turbine blade taken along line 6-6 of FIG. 4.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include cover plates disposed over porous inserts disposed within turbine blades. Turbine blades are subjected to high-temperature environments which may result in material failure of the blades. To enable improved cooling, a recess may be created in the blade and may then be filled with a porous insert (e.g., metallic/metal alloy foam). For example, the porous insert may be placed within the tip rail of the turbine blade, which is a life-limited area of the turbine blade. To protect the porous insert from the turbine environment, a protective cover plate may be disposed over the porous insert (e.g., brazed or welded). The cover plate outer surfaces may align with the outer surfaces of the turbine blade, which may retain the preferred aeromechanical properties of the turbine blade. Additionally, the use of the cover plate may provide protection for the porous insert without reducing the porosity of the insert, as opposed to other protection methods (e.g., thermal barrier coatings). The cover plate may enable complete airflow through the porous insert via perforations in the cover plate. Improved cooling flow may increase the overall cooling efficiency within the turbine blades, thereby increasing the operational life of the blades. Further, the protective cover plates may be used with other turbomachinery blades.

As may be appreciated, this may result in cost savings due to reduced turbine blade replacement and reduced turbine engine down-time.

Figure 1:
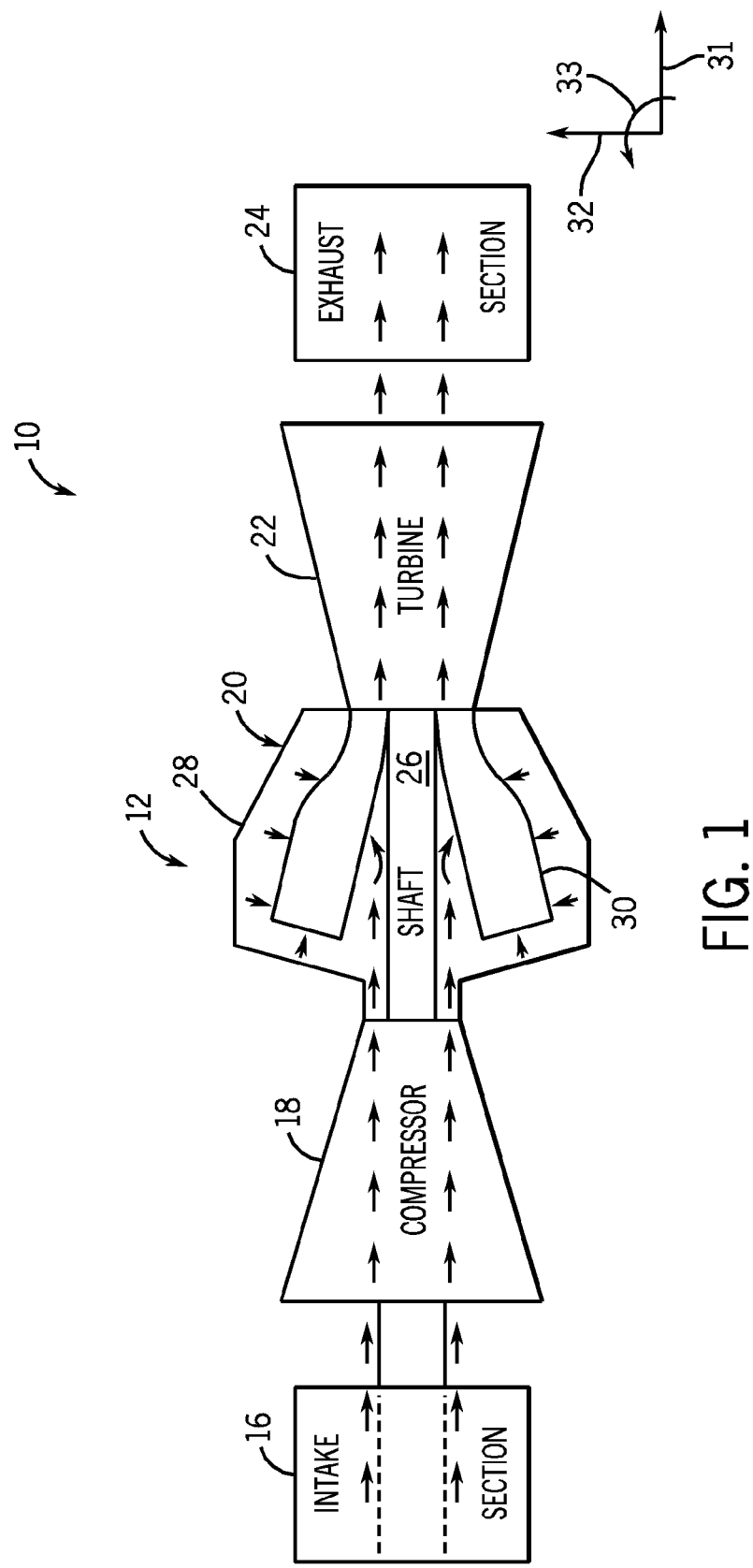
FIG. 1 is a schematic flow diagram of an embodiment of a gas turbine engine having cover plates coupled to gas turbine blades.

FIG. 1 is a block diagram of an exemplary system 10 including a gas turbine engine 12 that may employ turbine blades with porous inserts protected by cover plates. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters the combustors 30, where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor blades within turbine 22 to rotate the shaft 26. As discussed below, the turbine 22 may include a plurality of blades with metallic/metal alloy porous inserts disposed within the blades under a cover plate. After flowing through the turbine 22, the hot combustion gases may exit the gas turbine engine 12 through the exhaust section 24. For purposes of discussion, reference may be made to an axial direction 31, a radial direction 32, and a circumferential direction 33 about the axial direction 31.

Figure 2:
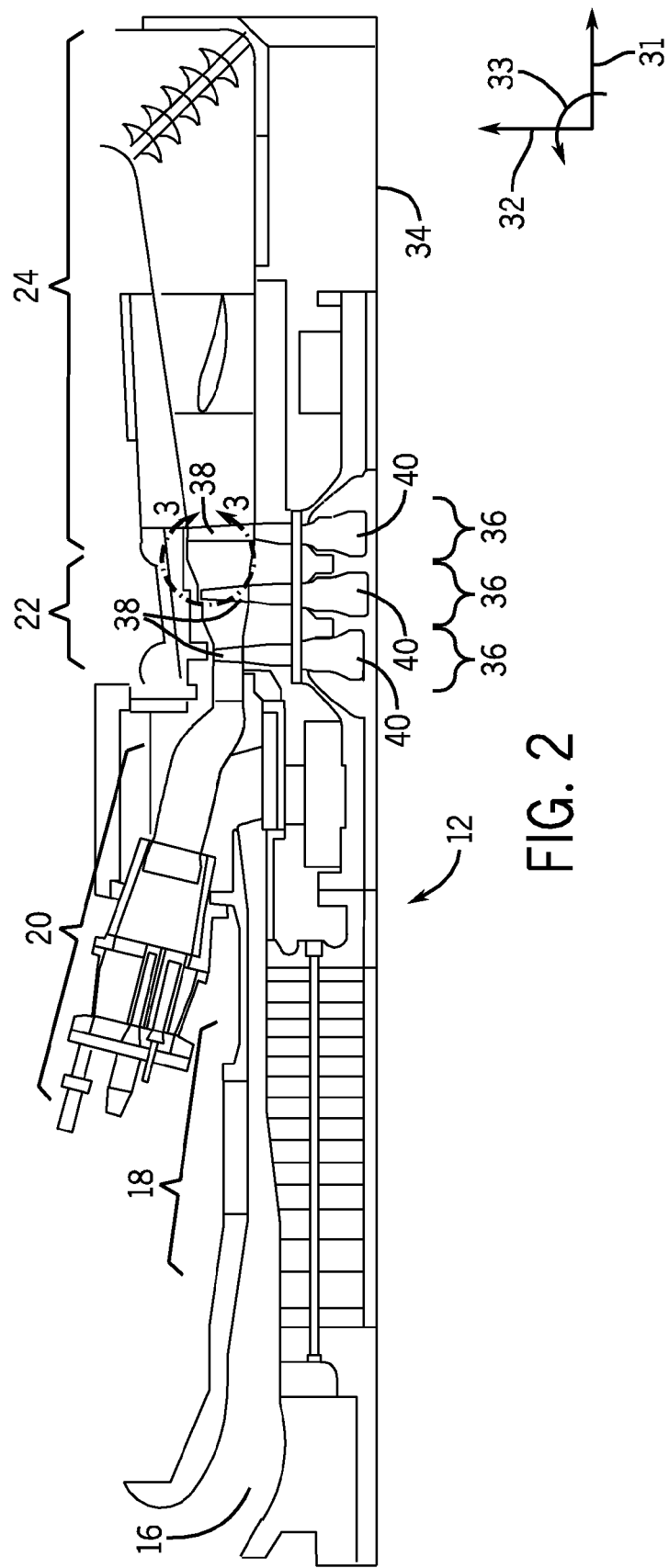
FIG. 2 is a cross-sectional side view of an embodiment of the gas turbine engine of FIG. 1 taken along the longitudinal axis.

FIG. 2 is a cross-sectional side view of an embodiment of the gas turbine engine 12 of FIG. 1 taken along the longitudinal axis 34. As depicted, the gas turbine 22 includes three stages 36. Each stage 36 includes a set of blades 38 coupled to a rotor wheel 40 that may be rotatably attached to the shaft 26 (FIG. 1). The blades 38 extend radially 32 outward from the rotor wheels 40 and are partially disposed within the path of the hot combustion gases. As detailed below, the blades 38 include a porous insert enclosed by a protective cover plate (see FIG. 3). Although the gas turbine 22 is illustrated as a three-stage turbine, the inserts and cover plates described herein may be employed in any suitable type of turbine with any number of stages and shafts. For example, the inserts and cover plates may be included in a single stage gas turbine, in a dual turbine system that includes a low-pressure turbine and a high-pressure turbine, in a steam turbine, or in another multi-stage turbine. Further, the inserts and cover plates may be incorporated in other turbomachinery blades.

As described above with respect to FIG. 1, air enters through the air intake section 16 and is compressed by the compressor 18. The compressed air from the compressor 18 is then directed into the combustor section 20 where the compressed air is mixed with fuel. The mixture of compressed air and fuel is generally burned within the combustor section 20 to generate high-temperature, high-pressure combustion gases, which are used to generate torque within the turbine 22. Specifically, the combustion gases apply motive forces to the blades 38 to turn the rotor wheels 40. In certain embodiments, the blades 38 may include internal cooling methods to reduce thermal stresses and prevent material failure induced by the high-temperature combustion gases. For example, internal cooling may be achieved by placing porous inserts (e.g., metallic porous inserts) within the blades 38 (e.g., the tip rails of the turbine blades 38) to allow cooling flow (e.g., airflow) throughout the blades 38. The porous inserts may be susceptible to the heat and substances in the combustion gases. Therefore, a protective cover plate may be placed over the porous inserts to prevent degradation (e.g., thermal breakdown) of the porous inserts.

Figure 3:
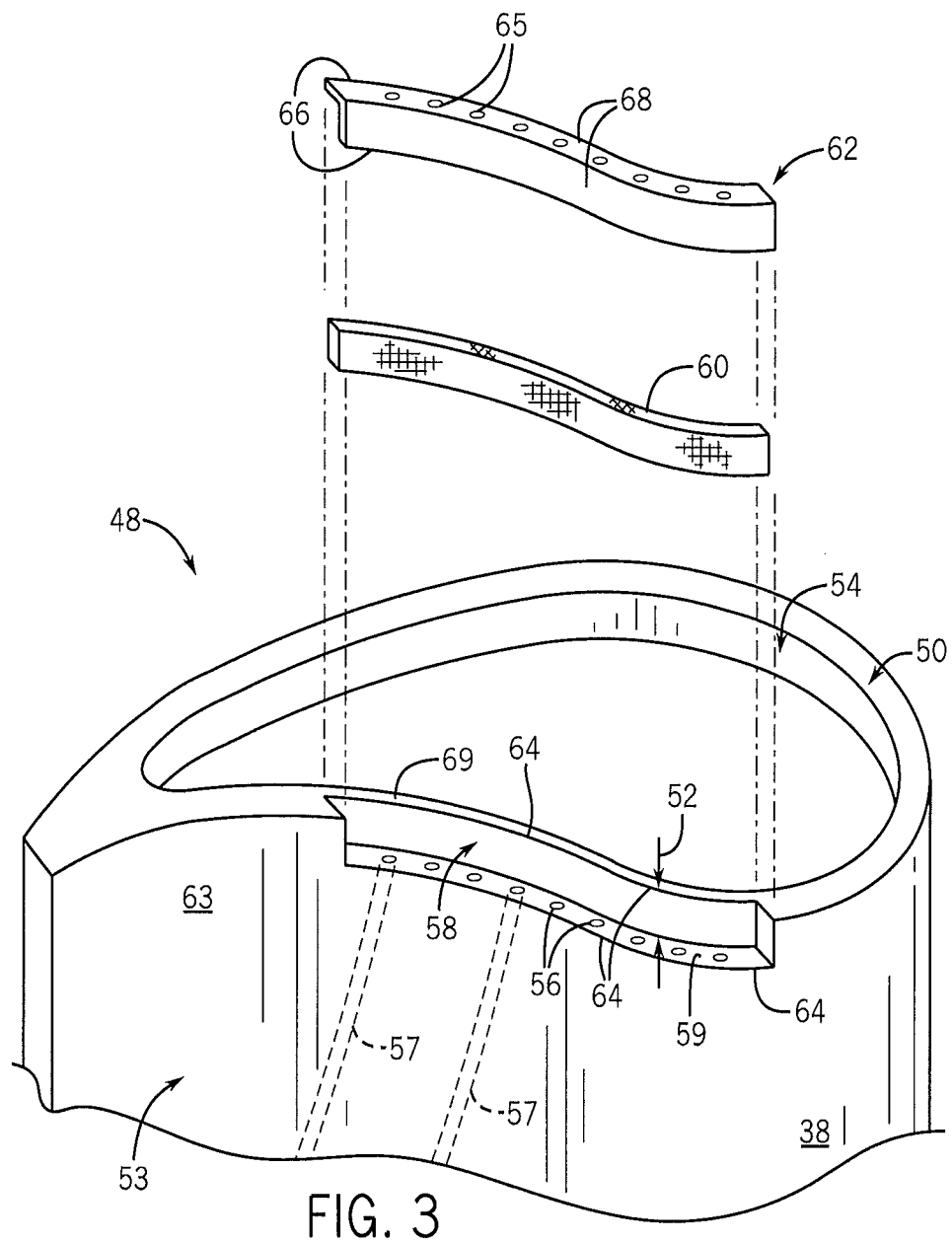
FIG. 3 is an exploded view of an embodiment of a tip of the gas turbine blade of FIG. 2 having a porous insert and a cover plate, taken within line 3-3 of FIG. 2.

FIG. 3 is an exploded perspective view of an embodiment of a tip 48 of the gas turbine blade 38 of FIG. 2. The blade 38 includes a tip rail 50 extending radially 32 a distance 52 from a body 53 of the blade 38. The tip rail 50 may extend around the perimeter of the blade 38 and may define a depression 54 or recessed region in the tip 48 of the blade 38. The tip rail 50 and the depression 54 may be beneficial cooling features of the blade 38. The blade 38 may contain other cooling features, such as cooling openings 56. The cooling openings 56 are coupled to cooling passages 57 (represented by dashed lines) that extend through the body 53 of the blade 38 from a base 59 of the tip rail 50 to another opening or inlet located on the blade 38 (e.g., in the radial direction 32). The orientation of the cooling passages 57 may vary, for example, the passages 57 may be perpendicular or angled with respect to the vertical axis of the blade 38. For simplicity, only a couple of passages 57 are illustrated.

As shown in FIG. 3, a recess 58 is formed in a surface 63 of the blade 38. For example, the recess 58 is formed in the tip rail 50 on the blade 38. In certain embodiments, the recess 58 may be disposed in another location of the blade 38 besides the tip rail 50 or disposed along any portion of the tip rail 50. A porous insert 60 may be disposed within the volume of the recess 58. The porous insert 60 may be made of a metal/metal alloy, a high-temperature plastic, or another high-temperature resistant porous material. In a particular embodiment, nickel or another suitable metal and/or metal alloy may be used to form a porous mesh structure. The use of the porous structure may improve cooling within the blade tip 48 by utilizing material and geometrical heat transfer properties. The porous insert 60 may have large enough pores such that cooling flow from the cooling openings 56 may pass through it. The structure of the porous insert 60 may resemble that of a sponge (e.g., a 3-D network of pores). For example, the porous insert 60 may contain approximately 1 to 1000, 5 to 750, or 10 to 500 pores per inch. Use of the porous insert 60 in the tip 48 of the blade 38 may increase the component life of the blade 38 when the porous insert 60 is placed at life-limiting locations (e.g., blade 38 locations subject to high thermal stresses). In the depicted embodiment of FIG. 3, the porous insert 60 fits completely within the recess 58 and leaves enough space for a cover plate 62 to align with the blade edges 64.

The cover plate 62 overlays the porous insert 60 and may protect the porous insert 60 from the severe environment within the turbine 22. The cover plate 62 may protect the porous insert 60 without affecting its porosity, as a thermal barrier coating would. Thus, the cover plate 62 may not interfere with the cooling properties of the porous insert 60 within the blade tip 48. As such, the cover plate 62 may contain perforations 65 along a surface 68 to enable cooling air to pass through the cover plate 62. The perforations 65 may be generally smaller, equivalent, or larger in size than the pores of the porous insert 60. Further, portions of the cover plate 62 may be removed to enable cooling airflow through the cover plate 62.

To prevent non-linear heat transfer and other discontinuities between the cover plate 62 and the blade 38, the cover plate 62 may be formed of the same material (e.g., cast alloy) as the blade 38. This may enable both pieces to respond to the environment similarly. Alternatively, based on design specifications, the cover plate 62 may be formed of a different material than that of the blade 38. The cover plate 62 is shaped or contoured such that its outer surfaces align with the outer surfaces 63 of the blade 38. In this way, the aeromechanical properties of the blade 38 may not be altered and the aerodynamic efficiency of the blade 38 may remain consistent with the original blade 38 design. This may enable the porous insert 60 and cover plate 62 to be added to the blade 38 as part of a retrofit. However, the blades 38 may be constructed with one or more recesses 58 already in place. The cover plate 62 may be constructed by casting, welded fabrication, brazed fabrication, or another method.

Figure 4:
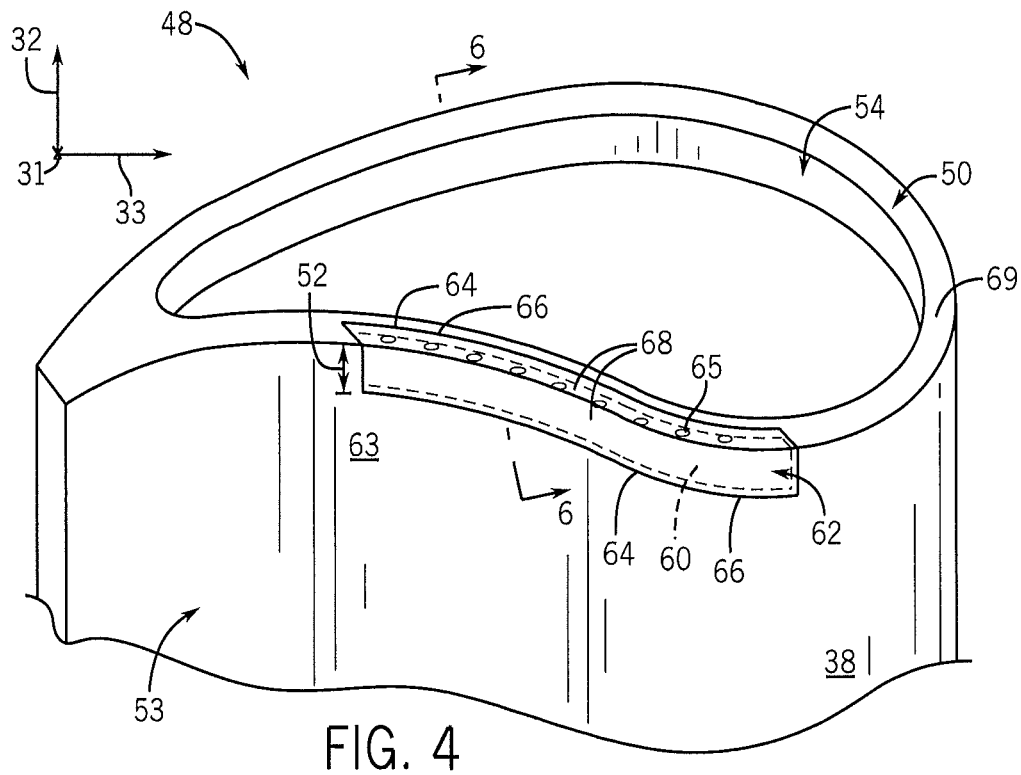
FIG. 4 is a perspective view of an embodiment of the tip of the gas turbine blade of FIG. 3 having the porous insert and the cover plate.

FIG. 4 is an assembled view of an embodiment of the tip 48 of the gas turbine blade 38. In this embodiment, the porous insert 60 is disposed within the tip rail 50 and is protected within the recess 58 by the cover plate 62. The cover plate 62 may be coupled to the blade 38 via a brazing process. In one embodiment, the brazing process may consist of: placing the porous insert 60 within the recess 58 of the tip rail 50, coating the outer edges 66 of the cover plate 62 with a blocking material, placing the cover plate 62 over the porous insert 60, and brazing the cover plate 62 to the blade 38 using a braze filler material. The blocking material may be a "stop-off" (e.g., a material that impedes the flow of braze material) and may be in the form of a paste, tape, paint, spray, etc. The blocking material may contain boron nitride or other chemical compounds, which may prevent the braze filler material from occluding the pores of the metallic porous insert 60 during the brazing process. The braze filler material may be palladium-based, such that it may be high-temperature resistant, corrosion resistant, and preserve the porosity of the porous insert 60.

The brazing cycle may be beneficial for maintaining the structural and functional integrity of the porous insert 60 and maintaining the aerodynamic properties of the blade 38. Therefore, various aspects of the brazing cycle may be monitored, such as, the volume of filler material used, the brazing temperature, and so on. Other factors may be monitored and controlled as well, for example, the use of flux, brazing atmosphere composition, and/or joint clearances/tolerances. Additionally, various brazing techniques may be used, such as, torch brazing, furnace brazing, dip brazing, infrared brazing, laser brazing, another brazing technique, or a combination thereof. However, in addition to brazing, welding may be used as the coupling method. Determination of the brazing or welding method to be used would be application specific.

Figure 5:
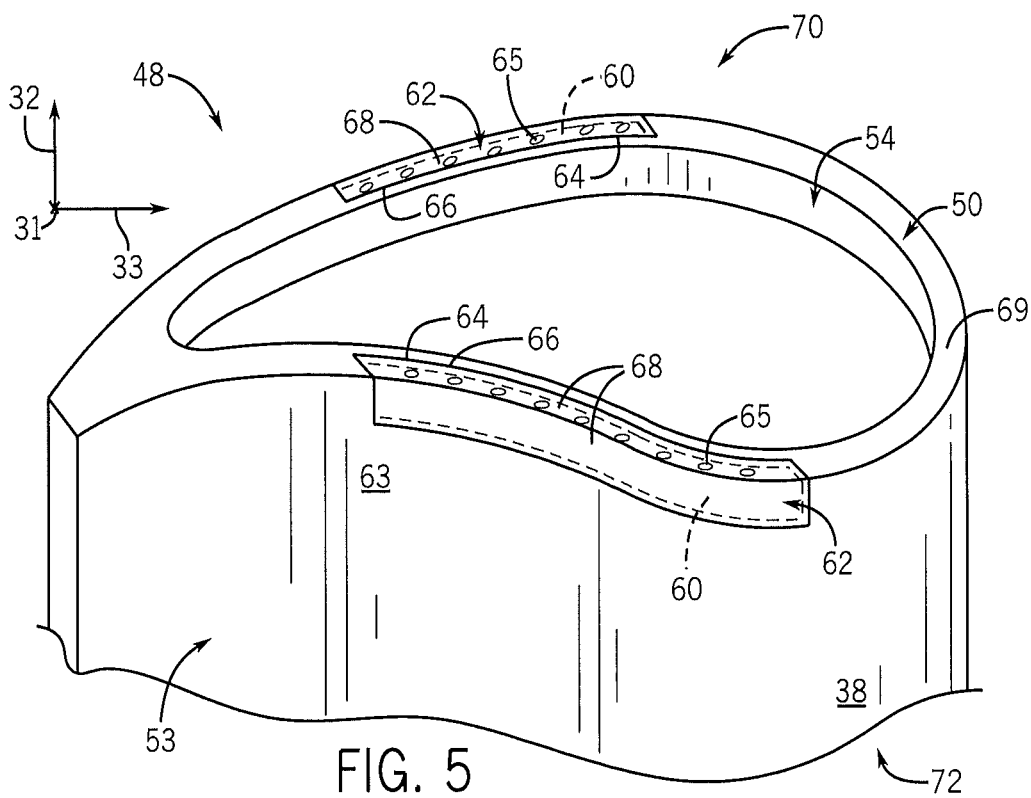
FIG. 5 is a perspective view of an embodiment of the tip of the gas turbine blade of FIG. 3 having multiple porous inserts and cover plates.

FIG. 5 is an embodiment with multiple recesses 58 each filled with a porous insert 60 (represented by dashed lines) and covered with a cover plate 62. The tip rail 50 of the blade 38 may contain a multitude of these assemblies. The porous inserts 60 and cover plates 62 may be employed on a suction side 70 of the blade 38, a pressure side 72 of the blade 38, or both sides. The porous inserts 60 and cover plates 62 may also be employed elsewhere along the tip rail 50. Furthermore, the recess 58, porous insert 60, and cover plate 62 assembly may be used on a different surface 63 location of the body 53 of the blade 38. The assemblies may also be used on multiple blades 38 within the turbine 22 and within various stages 36 of the turbine 22. The recess 58 may be of any suitable geometry, such as, cylindrical, prismatic, conical, or a different geometry. The porous insert 60 and cover plate 62 may have suitable geometries complementing that of the recess 58.

FIG. 6 is a cross-sectional view of an embodiment of the tip 48 of the gas turbine blade 38, taken along line 6-6 of FIG. 4. As shown in the depicted embodiment, the outer surfaces 68 of the cover plate 62 align directly with the outer surfaces 63 of the blade 38 and the top 69 of the tip rail 50, which tightly enclose the porous insert 60. This arrangement maintains the designed aerodynamic properties of the blade 38, while protecting the porous insert 60 from the severe environment of the turbine 22. As compared to the use of coatings (e.g., thermal barrier coatings), the cover plate 62 may also be beneficial in that the porosity of the porous insert 60 is maintained. The cover plate 62 may have any suitable geometry as determined by operational objectives of the system 10. Also shown, the cooling opening 56 transports cooling flow through the body of the blade 38 into the porous insert 60 to improve heat transfer within the tip 48 of the blade 38. The cooling flow from the cooling opening 56 may pass unobstructed through the porous insert 60 and exit through the perforations 65 in the cover plate 62. This design may allow for optimal cooling, particularly at life-limiting regions of the tip 48. Without the use of the porous insert 60 and cover plate 62, the turbine blade 38 may have a shorter useable life, resulting in costly and time consuming replacement procedures.

Technical effects of the disclosed embodiments include adaptations to a turbine blade 38 to enable improved cooling. A recess 58 in the blade 38 may be filled with a porous insert 60. For example, the porous insert 60 may be placed along the tip rail 50 of the turbine blade 38, which is a life-limited area (e.g., high thermal stress region) of the turbine blade 38. To protect the porous insert 60, a cover plate 62 may be disposed over the porous insert 60. The cover plate 62 may be shaped such to retain the preferred aeromechanical properties of the turbine blade 38. Additionally, the use of the cover plate 62 may protect the porous insert 60 without forsaking the porosity of the insert 60. The cover plate 62 may enable complete airflow through the porous insert 60 with perforations 65 in the cover plate 62, which may improve the overall cooling efficiency of the turbine blades 38, thereby increasing the operational life of the blades 38. This may result in cost savings due to reduced turbine blade 38 replacement and reduced gas turbine engine 12 down-time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine blade comprising a tip rail located at a radial tip of the turbine blade and a first recess formed within the tip rail of the turbine blade;
   a first porous insert comprising a plurality of pores that enable a cooling fluid to flow through the first porous insert; and
   a first cover plate, wherein the first porous insert is disposed within the first recess, and the first cover plate is disposed over the first porous insert to enclose the first porous insert within the first recess.

2. The system of claim 1, wherein the first recess is formed on a pressure side of the turbine blade.

3. The system of claim 1, wherein the first recess is formed on a suction side of the turbine blade.

4. The system of claim 1, wherein the first cover plate comprises an outer edge, and the outer edge is coupled to the turbine blade without blocking flow of the cooling fluid through the first porous insert.

5. The system of claim 4, wherein the first cover plate is coupled to the turbine blade via brazing.

6. The system of claim 5, wherein an interface between the outer edge of the first cover plate and the turbine blade comprises a blocking material to block a brazing material from entering into the plurality of pores and blocking flow of the cooling fluid through the first porous insert.

7. The system of claim 6, wherein the blocking material comprises boron nitride.

8. The system of claim 1, wherein the first porous insert comprises a metal.

9. The system of claim 1, wherein the turbine blade comprises a second recess formed within the tip rail, a second porous insert disposed in the second recess, and a second cover plate disposed over the second porous insert.

10. The system of claim 1, wherein the system comprises a plurality of turbine blades, each having a respective porous insert and a respective cover plate enclosing the respective porous insert within its respective recess.

11. The system of claim 1, comprising a gas turbine engine having the turbine blade, the first porous insert, and the first cover plate.

12. The system of claim 1, wherein the first recess is formed within a top surface of the tip rail.

13. The system of claim 12, wherein the tip rail defines a recessed region between an inner surface of the tip rail at the radial tip of the turbine blade, and the first recess is formed on an outer surface of the tip rail opposite the recessed region.

14. The system of claim 13, wherein the first cover comprises a first wall portion having a first outer surface that aligns with the top surface of the tip rail and a second wall portion having a second outer surface that aligns with the inner surface of the tip rail.

15. The system of claim 14, wherein the first cover comprises one or more perforations in the first wall portion to enable the cooling fluid to pass from within the first recess to without the turbine blade.

16. A method, comprising:
disposing a porous insert within a recess of a turbine blade, wherein the recess is formed within a tip rail located at a radial tip of the turbine blade and the porous insert comprises a plurality of pores that enable a cooling fluid to flow through the porous insert;
applying a blocking material to an outer edge of a cover plate;
disposing the cover plate over the porous insert; and
brazing the cover plate to the turbine blade to enclose the porous insert within the recess.

17. The method of claim 16, comprising blocking, via the blocking material, a brazing material from entering the plurality of pores during the brazing.

18. The method of claim 17, wherein the blocking material comprises boron nitride.

19. The method of claim 16, wherein the porous insert comprises a metal.

20. A system, comprising:
a gas turbine engine, comprising:
a plurality of gas turbine blades, wherein at least two gas turbine blades of the plurality of gas turbine blades each comprises a tip rail located at a radial tip and a recess formed within its respective tip rail;
a metallic porous insert disposed within each recess, wherein each metallic porous insert comprises a plurality of pores that enable a cooling fluid to flow through each metallic porous insert; and
a cover plate disposed over each metallic porous insert, wherein each cover plate is coupled to each respective gas turbine blade of the at least two gas turbine blades to enclose each respective metallic porous insert within its respective recess, and each cover plate is coupled to each respective gas turbine blade without blocking flow of the cooling fluid flow through the metallic porous insert.

21. The system of claim 20, wherein each cover plate is coupled to each respective gas turbine blade via brazing, and an interface between an outer edge of each cover plate and each respective gas turbine blade comprises boron nitride to block a brazing material from entering into the plurality of pores of each metallic porous insert and blocking flow of the cooling fluid though each metallic porous insert.

* * * * *